United States Patent

[11] 3,617,532

| [72] | Inventors | Robert A. Plundo<br>Greensburg, Pa.;<br>Bruce K. Schmid, Prarie Village, Kans. |
|---|---|---|
| [21] | Appl. No. | 770,058 |
| [22] | Filed | Oct. 23, 1968 |
| [45] | Patented | Nov. 2, 1971 |
| [73] | Assignee | Gulf Research & Development Company<br>Pittsburgh, Pa. |

[54] HYDROTREATING PROCESS
5 Claims, No Drawings

[52] U.S. Cl. .................................................. 208/264,
        208/18, 208/143, 252/432
[51] Int. Cl. .................................................. C10g 23/02
[50] Field of Search .......................................... 208/143,
        18, 264, 243; 252/432

[56] References Cited
UNITED STATES PATENTS

| 2,787,582 | 4/1957 | Watkins et al. | 208/58 |
| 2,878,180 | 3/1959 | Watkins | 252/432 |
| 3,057,807 | 10/1962 | Cox et al. | 208/143 |
| 3,172,839 | 3/1965 | Kozlowski | 208/143 |
| 3,223,652 | 12/1965 | Erickson et al. | 208/143 |
| 3,267,043 | 8/1966 | Mulaskey | 252/432 |
| 3,285,848 | 11/1966 | Donaldson et al. | 208/212 |
| 3,288,704 | 11/1966 | O'Hara et al. | 208/143 |
| 3,313,859 | 4/1967 | Doane | 208/143 |
| 3,125,507 | 3/1964 | Tupman et al. | 208/216 |

*Primary Examiner*—Herbert Levine
*Attorneys*—Deane E. Keith, Donald L. Rose and Meyer Neishloss

ABSTRACT: Hydrotreating catalysts promoted with boria increase the viscosity index and decrease the iodine number of lube oil charge stocks.

HYDROTREATING PROCESS

This invention relates to a process for upgrading lube oil charge stocks. More particularly, this invention relates to a process for upgrading lubricating oil charge stocks over a novel boria promoted hydrotreating catalyst at hydrotreating conditions to obtain high viscosity index and low iodine number lubricating oils.

Viscosity index and iodine number are two measurements employed in lube oil specifications as general indicators of the quality of the oil. Viscosity index indicates an oil's resistance to viscosity change with fluctuation in temperature. The higher the viscosity index of a lubricant, the more resistant it is to viscosity change caused by temperature fluctuation. Iodine number is the indicator of the amount of unsaturated linkages appearing in the molecules present in the oil at which iodine can be added. Unsaturated linkages are more easily oxidized than saturated linkages, especially at elevated temperatures, with consequent degradation of the oil. Therefore a high quality lubricating oil, one which is particularly desirable for automotive uses, should possess a relatively high viscosity index and a relatively low iodine number.

It is known that supported hydrotreating catalysts containing metallic hydrogenating components can be employed to obtain improved lubricating oil from lubricating oil charge stocks. Although use of such catalysts results in some improvement, there is still a great need for a further improved process that will result in increased yield and viscosity index and decreased iodine number. Various materials are known to promote the activity of these catalysts. The halogens, particularly fluorine, promote the activity of lube oil hydrotreating catalysts. But various problems are encountered when a halogen, particularly fluorine, is employed for this purpose. Equipment corrosion and the resulting maintenance costs or the necessary employment of expensive corrosion resistant equipment are distinct disadvantages accompanying the use of the halogens. Moreover, the catalyst readily loses its halogen constituent during the reaction. Makeup halogen must be incorporated into the feed to compensate for this loss, thereby increasing overall operating expenses as well as increasing corrosion problems.

We have discovered a novel hydrotreating catalyst and process which upgrades lubricating oil charge stocks in high yields to high grade lubricating oils which have a substantially improved viscosity index and iodine number. We have unexpectedly found that the addition of boria to supported catalysts containing metallic hydrogenation components promotes their activity for the upgrading of lube oil charge stocks to lubricating oils possessing a significantly higher viscosity index and lower iodine number than previously obtained at equivalent conditions without the serious problems encountered with the use of fluorine and similar promoters. Alternatively, lubricating oils are obtained in high yields using this boria promoted catalyst at operating temperatures up to 60° F. or more below the temperatures generally required to obtain an oil with similar viscosity index and iodine number using the same catalyst without boria addition.

The hydrotreatment of lubricating oil feed stocks to bring about the improvements indicated above is believed to consist of selective hydrogenation and ring scission. Hydrogenation saturates undesired olefins as well as aromatic rings and reduces fused polycyclic aromatics present in the charge stock to fused polycyclic naphthene-aromatic compounds or fused polycyclic naphthenes. Furthermore, these fused polycyclic compounds are subjected to partial ring scission, a selective type of ring opening, which cleaves these polycyclic compounds generally at one or more naphthene rings into monocyclic naphthenes or aromatics with relatively untouched alkyl side chains. Other reactions also occur, but the ones enumerated above appear to the main reactions accounting for the increased viscosity index and decreased iodine number of the product lubricating oil. Evidence indicates that the catalyst of our invention possesses unusually high activity for these reactions which appear to be responsible for the production of high grade lubricating oils.

The activity of lube oil hydrotreating catalysts for the upgrading of lube oil stocks, as measured by viscosity index and iodine number, can be increased by raising the hydrotreating temperature. However, as the temperature is increased, the desired reactions which produce the high viscosity index and low iodine number are reduced in favor of undesired cracking reactions. These cracking reactions increase the yield of undesired, lower boiling, nonlube components and thereby lower the overall yield of the lube oil components. At equivalent hydrotreating conditions, our boria promoted catalyst is more selective for the desired reactions than nonboria containing catalysts with resulting significantly higher viscosity index and lower iodine number. Alternatively, a lower temperature can be employed with our catalyst to achieve the same improvement in viscosity index and iodine number as with a nonboria promoted catalyst. Thus, viscosity index and iodine number can be varied by controlling the hydrotreating temperature and yet, our boria promoted catalyst is superior to a catalyst without boria in each of these indicators at equivalent conditions. We are not certain of the exact form that boron is chemically present in the catalyst, or the manner that it is chemically bound into the support; therefore, for convenience, the boron in the catalyst is referred to by the term "boria," and is calculated hereinafter as the weight percent of $B_2O_3$ in the promoted support.

EXAMPLE I

The charge stock was an 80 percent Ordovician deasphalted residue—20 percent delta mix. Hydrotreatment was conducted at temperatures of 720°, 750°, and 780° F., a pressure of 3,000 pounds per square inch (p.s.i.g.), and a liquid hourly space velocity (LHSV) of 0.5. Hydrogen was incorporated into the feed at a rate of 5,000 standard cubic feet of hydrogen per barrel of hydrocarbon feed (s.c.f. $H_2$/bbl.), and the feed mixture was contacted with a hydrotreating catalyst containing 20 percent Ni and 20 percent W by weight of the calcined catalyst. The support was Harshaw Al-1,700 alumina with a Kellogg cracking activity of about 15. The catalyst was dried, calcined, and presulfided at 600° F. and 1 atmosphere pressure for 8 hours using a 10 percent $H_2S$–90 percent $H_2$ gas mixture. The product is a 725° F+ nondewaxed lubricating base oil.

TABLE I

| Run No. | 1 | 2 | 3 | 4 |
|---|---|---|---|---|
| Promoter, wt.% | | | | |
| F[a] | 0 | 2 | 2 | 0 |
| $B_2O_3$[b] | 0 | 0 | 10 | 10 |
| Viscosity Index Produced at Catalyst Temperature | | | | |
| 720° F. | 102 | 107.5 | 110 | 115 |
| 750° F. | | 120 | 120 | 130 |
| 780° F. 129 | | | 135 | 135 | 145 |
| Product Iodine No. Produced at Catalyst Temperature | | | | |
| 720° F. | 3.2 | 1.6 | 1.7 | 1.4 |
| 750° F. | 2.6 | 1.4 | 1.7 | 1.2 |
| 780° F. | 2.2 | 1.3 | 1.9 | 1.1 |

[a] Calculated as weight percent of the calcined catalyst before sulfiding.
[b] Calculated as weight percent of the promoted support.

A comparison of runs 2 and 3 shows that a hydrotreating catalyst containing 2 percent fluorine and 10 percent boria is essentially equivalent in activity to a catalyst containing 2 percent fluorine. Both of these catalysts are more active than the catalyst of run 1 which does not have either promoter. However, truly surprising is the increase in activity of the catalyst of run 4 which contains only boria and no fluorine. The viscosity index of the oil prepared over the catalyst containing only boria as a promoter is achieved at a temperature about 30° F. lower than the temperature required for an equivalent viscosity index lube oil prepared over a catalyst which does not contain either promoter. At equivalent conditions, viscosity indices of the lube oil prepared over the boria prepared catalysts are about 15 points higher than the lube oil prepared over a nonboria containing catalyst. This viscosity index enhancement is more than double the viscosity index increase observed when a lube oil is prepared at the same conditions over a catalyst containing boria and fluorine. Moreover, it is observed that the iodine number of the oil prepared over the boria containing catalyst is one-half that of the oil prepared over the catalyst containing no promoter. Also it is significantly superior to the iodine number of the lube oil prepared over the catalyst containing fluorine and boria.

According to the invention, the catalyst, in general, is any hydrotreating catalyst which can be promoted by minor quantities of boria. One or more Group VIII iron group metals, that is, iron, cobalt, and nickel, can be used in combination with one or more of the Group VI B metals, that is, chromium, molybdenum, and tungsten. When these metals are used, the metallic hydrogenation components comprise as the metal from about 5 to 50 weight percent of the calcined catalyst before sulfiding or more preferably from about 15 to 40 weight percent with a molar ratio of Group VIII iron group metal or metals to Group VI B metal or metals from about 0.3 to 5.0. We prefer a 20 percent Ni and 20 percent W catalyst. Other effective catalysts are one containing 6 percent Ni and 19 percent W, one containing 2.4 percent Ni–1.2 percent Co–11.4 percent Mo, and various combinations of Co, Ni, and Mo, etc.

The support material preferably has a cracking index on the Kellogg activity scale in the range from about 12 to about 35 percent. We prefer a support comprised of alumina, such as a Harshaw A1–1,700 which has a cracking index of about 15. However, other suitable supports can be used such as a silica-alumina, magnesia-alumina, etc. The boria is added to the catalyst in minor proportions, varying from about 2 to about 20 weight percent of the promoted support. A preferred quantity of boria is from about 8 to about 15 weight percent of the promoted support.

Any conventional method can be employed in the preparation of the catalyst. For example, we have found impregnation to be a satisfactory method for incorporating boria into the catalyst. The alumina support is calcined at about 1,000° F. for a suitable period of time such as about 1 to about 24 hours. It is preferred to incorporate boria into the catalyst prior to the addition of the hydrogenation component. For example, the alumina support is conveniently impregnated with a sufficient amount of boric acid solution to yield the proper amount of boria after calcination. The wet promoted catalyst support is dried at about 250° F. and then calcined at 1,000° F. for about 8 hours. Boria can also be incorporated concurrently with or after the addition of the metals as well.

The metallic components are incorporated into the catalyst support by any of the conventional methods such as impregnation, coprecipitation, stepwise precipitation, etc. For example, the support can be impregnated with a solution containing a salt of nickel and a salt of tungsten. The proportions of the salt placed in the solution are adjusted to produce a catalyst containing the desired total amount of metals and the desired ratio of metals. The impregnated support is dried and then calcined at 1,000° F. or at a temperature sufficiently high to convert the metals to an oxide form. The catalyst is then sulfided to convert a significant portion of the metal oxides to the sulfides.

The upgrading of feed stocks to lubricating oil products is carried out at conventional hydrotreating conditions. The temperature can be maintained between about 650° and 850° F. The preferred range is about 700° to about 820° F. The hydrotreating reaction can be carried out at about 1,500 to 4,000 p.s.i.g. with about 2,000 to 3,500 p.s.i.g. being preferred. The hydrogen rate can be about 1,000 to 15,000 s.c.f./bbl., preferably about 3,000 to 8,000 s.c.f./bbl. A space velocity of about 0.2 to 3.0 LHSV is suitable. We prefer a range of about 0.4 to 1.4 LHSV.

The charge stock to be hydrotreated over a catalyst prepared in the above manner can be a deasphalted residue, a heavy distillate boiling above about 650° F., any other heavier stock which is substantially asphalt free, a mixture in any proportions of these charge stocks, etc. Examples of these charge stocks include an Ordovician deasphalted residue, Ordovician unpressable distillate, 2,500 Texas distillate, West Texas gas oil, Kuwait gas oil, slack-wax, centrifuged wax, etc. It should be noted that these different charge stocks do not respond in the same degree to the hydrotreating process. This is demonstrated in example 2 by the comparison of a straight Ordovician deasphalted residue, a heavier 80 percent Ordovician–20 percent delta lube mix, and a still heavier Kuwait deasphalted vacuum residue.

EXAMPLE 2

In the tables below, A is an Ordovician Deasphalted Residue, B is a Deasphalted Residue—20 percent Delta Mix, and C is a Kuwait Deasphalted Vacuum Residue. Inspections of each charge stock are given in table II.

TABLE II

| Description | Charge stock inspections | | |
|---|---|---|---|
| | A | B | C |
| Gravity, °API | 23.8 | 23.1 | 11.4 |
| Viscosity, suv. sec. (extrapolated): | | | |
| 100° F | 2,900 | 3,500 | 115,000 |
| 150° F | 581 | 676 | 8,100 |
| 210° F | 158 | 177.6 | 986 |
| Viscosity index | 91 | 91 | 63 |
| Iodine Number | 12.2 | 13.7 | |
| Aromatics, weight percent | 44.0 | 29.9 | |
| Saturates, weight percent | 56.0 | 70.1 | |
| Total nitrogen; weight percent | 0.063 | 0.095 | 0.256 |
| Distillation; volume percent cond.: | | | |
| 5,° F | | 932 | 967 | >1,000 |
| 10,° F | | 967 | 993 | |
| 20,° F | | 994 | 1,009 | |
| 30,° F | | | 1,022 | |
| 40,° F | | | 1,038 | |
| 50,° F | | | 1,046 | |

It should be noted from table II that from left to right, the charge stocks contain increasing amounts of more viscous higher boiling components.

A catalyst comprised of 20 percent Ni, 20 percent W, and 2 percent fluorine supported on Harshaw A1–1,700 alumina is dried, calcined, and presulfided. Hydrotreatment was conducted at temperatures of 720°, 750°, and 780° F., a pressure of 3,000 p.s.i.g., an LHSV of 0.5 and a hydrogen rate of 5,000 s.c.f./bbl. The results of these runs are below.

TABLE III

| Charge stock | Viscosity index produced at catalyst temperature, ° F. | | | Iodine number produced at catalyst temperature, ° F. | | |
|---|---|---|---|---|---|---|
| | 720 | 750 | 780 | 720 | 750 | 780 |
| A | 115 | 129 | 143 | 1.4 | 1.2 | 1.1 |
| B | 107.5 | 120 | 135 | 1.6 | 1.4 | 1.3 |
| C | | | 96 | | | 6.7 |

The results in table III show that hydrotreating conditions must be adjusted to produce lube oil of the same quality from different lube stocks. In general, hydrotreating conditions must be more severe to produce a high quality lube oil from a charge stock which contains greater amounts of viscous high-boiling components than a charge stock containing smaller quantities of these components. However, the use of various lube stocks does not diminish the advantages obtained by adding boria as a catalyst promoter.

Following are additional specific examples of this invention. These examples are illustrative of our invention and are set forth below without any intention of limiting our invention in any manner.

EXAMPLE 3

A catalyst support was prepared by calcining 541.1 g. of 10 to 20 mesh Harshaw Al-1,700 alumina at 1,000° F. for 10 hours. To obtain a support having approximately 10 weight percent boria, 610 cc. of 2.83 molar $H_3BO_3$ solution was added to the alumina at 70° C. The volume of solution used brought the alumina to the point of incipient wetness. The wet promoted support was dried at 250° F. for 24 hours and calcined at 1,000° F. for 9 hours. The boria content of the dried promoted support was calculated to be 10.2 weight percent boria.

A total of 497.8 g. of nickel nitrate, $Ni(NO_3)_2$, and 1,288.4 g. of ammonium metatungstate, $(NH_4)_2W_4O_{13}$, were added to the calcined promoted support in three separate impregnations. The volume of solution used in each impregnation was fixed so that the point of incipient wetness would be reached when all the solution was absorbed by the promoted support. The concentration of nickel and tungsten salts used in each impregnation step corresponded to adding 40 percent of the metals in the first step, 36 percent in the second step, and 24 percent in the third step. A description of the solution used in each impregnation step follows:

TABLE IV

| Impregnation | Total solution added, cc. | Molar concentration | |
|---|---|---|---|
| | | Nickel nitrate | Ammonium metatungstate |
| 1st | 460 | 3,585 | 0.2859 |
| 2nd | 410 | 3.617 | 0.2890 |
| 3rd | 350 | 2.830 | 0.2252 |

After each impregnation, the catalyst was dried at 250° F. for 24 hours and calcined at 1,000° F. for 9 hours. After the final drying and calcination, the catalyst weight was 1,194.0 g. The Ni content was 20.3 percent, and the W content was 20.3 percent. The catalyst was then treated with a 10 percent $H_2S$–90 percent $H_2$ gas mixture at a temperature of 600° F. and 1 atmosphere pressure at 1,890 GHSV for 8 hours. After sulfiding, the catalyst contained 13.3 percent by weight sulfur.

EXAMPLE 4

Two-charge stocks, an 80 percent Ordovician–20 percent Delta mix, and a Kuwait deasphalted vacuum residue, were hydrotreated using the catalyst prepared in example 3 at 720°, 750°, and 780° F., 3,000 p.s.i.g., 5,000 s.c.f./bbl. and 0.5 LHSV. The products from these runs were 725° F+ nondewaxed base oils with the following characteristics:

TABLE V

| Charge stock | Viscosity index produced at catalyst temperature, ° F. | | | Product iodine number produced at catalyst temperature, ° F. | | |
|---|---|---|---|---|---|---|
| | 720 | 750 | 780 | 720 | 750 | 780 |
| 80% ord-20% delta | 115 | 130 | 145 | 1.4 | 1.2 | 1.0 |
| Kuwait deasphalted residue | | | 105 | | | 6.1 |

It should be noted that the quality of lube product obtained from each stock, using the boria promoted catalyst of example 3, is superior to the quality of oil produced from these same stocks using a nonboria promoted catalyst, as in example 2.

EXAMPLE 5

A series of catalysts was prepared according to the procedure of example 3 using Harshaw Al-1,700 alumina support with differing quantities of boria present in each. An 80 percent Ordovician–20 percent Delta mix charge stock was upgraded to high grade lubricating oils under the conditions of example 4 using these catalysts.

TABLE VI

| Boria: Weight percent of promoted support | 0 | 2 | 5 | 10 | 15 | 20 |
|---|---|---|---|---|---|---|
| Viscosity index produced at catalyst temperature, ° F.: | | | | | | |
| 720 | 102 | 103 | 107 | 115 | 113 | 109 |
| 750 | 114 | 114.5 | 116 | 130 | 129 | 124.5 |
| 780 | 129 | 134 | 132 | 145 | 142 | 140 |
| Product iodine No., produced at catalyst temperature, ° F.: | | | | | | |
| 720 | 3.2 | 1.8 | 2.4 | 1.4 | 1.5 | 3.0 |
| 750 | 2.6 | 1.8 | 2.4 | 1.2 | 1.6 | 1.6 |
| 780 | 2.2 | 1.8 | 1.8 | 1.0 | 1.4 | 1.3 |

The results in this table demonstrate the promotional effects of boria. The highest quality lube oil was obtained over a catalyst containing 10 percent boria.

EXAMPLE 6

Two catalysts were prepared according to the procedure of example 3. Each catalyst is a 6 percent Ni and 19 percent W on Harshaw Al-1,700. However, one catalyst does not contain boria and the other contains 10 weight percent boria. An 80 percent Ordovician–20 percent Delta mix charge stock and conversion conditions as described in example 4 were employed in this example.

TABLE VII

| Boria: weight percent of promoted support | VI produced at catalyst temperature, ° F. | | | Iodine Number produced at catalyst temperature, ° F. | | |
|---|---|---|---|---|---|---|
| | 720 | 750 | 780 | 720 | 750 | 780 |
| 0 | 96 | 98 | 115 | 4.8 | 4.5 | 3.9 |
| 10 | 108 | 119 | 134 | 2.8 | 2.4 | 1.9 |

It should be noted that the catalyst containing 10 percent boria produced a given viscosity index product at a temperature 30° F. or more lower than the catalyst without boria. A much larger iodine number decrease with the boria containing catalyst is also observed.

EXAMPLE 7

Two catalysts were prepared in a manner similar to that of example 3. Each catalyst is a 2.4 percent Ni-1.2 percent Co—11.4 percent Mo on a Filtrol Grade 86 alumina with a Kellogg cracking index of about 29. One catalyst did not contain boria and the other contained 10 weight percent boria. The same charge stock and conversion conditions used in example 6 were employed in this example.

TABLE VIII

| Boria: weight percent of promoted support | VI produced at catalyst temperature, ° F. | | | Iodine Number produced at catalyst temperature, ° F. | | |
|---|---|---|---|---|---|---|
| | 720 | 750 | 780 | 720 | 750 | 780 |
| 0 | 95 | 100 | 106 | 11.6 | 4.7 | 4.0 |
| 10 | 107 | 119 | 134 | 2.5 | 2.0 | 1.8 |

In this example, the boria containing catalyst produced a given viscosity index product at a temperature 60° F. lower than the catalyst which does not contain boria. The overall excellence of the boria containing catalyst with regard to decreased iodine number should also be observed.

We have found that boria promoted catalysts can be conveniently regenerated at high temperatures, approximately 900° to 1,000° F. or higher, in the presence of a major quantity of nitrogen and a minor quantity of air. The moisture content of the mixture should be less than about 1,000 p.p.m. The usual regeneration technique employed for spent catalysts, oxidation using air with steam as a carrier or diluent gas, is not effective here because major quantities of boria are lost in the process. By utilizing relatively moisture-free regeneration gas, boria losses during regeneration are avoided. This is illustrated in the following example.

EXAMPLE 8

A series of 20 percent Ni and 20 percent W on alumina catalysts which contained boria from 2 to 20 weight percent of the promoted support are used to hydrotreat an 80 percent Ordovician–20 percent Delta mix charge stock using conditions as in example 4. At the end of the run, the catalyst analyzed from 2 percent to 8 percent by weight carbon. Samples of these catalysts were regenerated using air and either steam or nitrogen as a diluent gas. The conditions of regeneration were 2.9 percent air for 2 hours and 9.5 percent air for 2 hours, followed by 14.3 percent air for 18 hours at a rate of 11,300 GHSV and a temperature of about 900° F. to about 1,000° F. The air contained about 1,000 p.p.m. water. The results of these regenerations are summarized in table IX.

TABLE IX

| Gas Stream | Nitrogen—Air | Steam—Air |
|---|---|---|
| % Carbon Removed | <95% | <95% |
| % Boron Removed | 0%–5% | 50%–60% |
| % Loss in Surface Area >15% | | >15% |

This data shows that boria is retained on the catalyst in a relatively anhydrous regeneration atmosphere. In addition, no sintering was caused by the high temperatures used in these regenerations. An activity check of one of the regenerated catalysts, 20 percent Ni and 20 percent W on 90 percent alumina and 10 percent boria, showed that only about 10° F. activity is lost during a nitrogen-air regeneration.

From the specific examples set forth, the significant contributions to the lube oil art of a boria promoted hydrotreating catalyst are readily observed. The addition of boria to the catalyst assists in producing a high quality lubricating oil with a significantly high viscosity index and low iodine number.

Whereupon we claim the following:

1. A process comprising contacting a lube oil charge stock boiling above 650° F. substantially free of asphaltic components with a hydrotreating catalyst having from about 10 to about 50 weight percent of at least one metallic hydrogenating component selected from Group VIII iron group metals and at least one metallic hydrogenating component selected from Group VI B metals with the molar ratio of Group VIII iron group components to Group VI B components being from about 0.3 to about 5.0, on a support having a Kellogg cracking index of about 12 to about 35, said support consisting essentially of alumina and said support promoted with about 8 to about 15 weight percent boria at hydrotreating conditions including a pressure of from about 2,000 p.s.i.g. to about 4,000 p.s.i.g. a temperature from 650° to 850° F. and a space velocity of about 0.2 to 3 LHSV and recovering a product lube oil with substantially improved viscosity index and iodine number.

2. A process in accordance with claim 1 in which the catalyst has from about 15 to about 40 weight percent metallic hydrogenating components.

3. A process in accordance with claim 1 in which the metallic hydrogenating components are nickel and tungsten.

4. A process in accordance with claim 3 in which the catalyst contains about 20 percent Ni and about 20 percent W.

5. A process in accordance with claim 1 in which hydrotreating is carried out at a temperature of about 700° F. to about 820° F.

* * * * *

PO-1050
(5/69)

UNITED STATES PATENT OFFICE
CERTIFICATE OF CORRECTION

Patent No. 3,617,532　　　　　　　　Dated November 2, 1971

Inventor(s) Robert A. Plundo and Bruce K. Schmid

It is certified that error appears in the above-identified patent and that said Letters Patent are hereby corrected as shown below:

<u>Col. 1, line 70</u> - "appear to the main reactions" should read
--appear to be the main reactions--

<u>Col. 5, lines 18 and 19</u> - After the phrase "10.2 weight percent" a period should be inserted and the word "boria" deleted, with the following sentence inserted:

--Analysis of this promoted support showed 10.44 weight percent boria. --.

<u>Col. 5, Table IV</u> - Under the column "Nickel nitrate" the figure "3,585" should read --3.585--.

<u>Col. 7, Table IX</u> - The Table should read as follows:

TABLE IX

| Gas Stream | Nitrogen-Air | Steam-Air |
|---|---|---|
| % Carbon Removed | >95% | >95% |
| % Boron Removed | 0%-5% | 50%-60% |
| % Loss in Surface Area | <15% | <15% |

Signed and sealed this 30th day of May 1972.

(SEAL)
Attest:

EDWARD M. FLETCHER, JR.　　　　　　ROBERT GOTTSCHALK
Attesting Officer　　　　　　　　　　Commissioner of Patents